(12) United States Patent
Cheng (10) Patent No.: US 8,239,154 B2
(45) Date of Patent: *Aug. 7, 2012

(54) METHOD AND APPARATUS FOR RESOLVER COMPENSATION

(75) Inventor: Bing Cheng, West Bloomfield, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 443 days.

This patent is subject to a terminal disclaimer.

(21) Appl. No.: 12/199,940

(22) Filed: Aug. 28, 2008

(65) Prior Publication Data

US 2008/0309267 A1 Dec. 18, 2008

Related U.S. Application Data

(62) Division of application No. 11/601,606, filed on Nov. 16, 2006, now Pat. No. 7,469,193.

(51) Int. Cl.
*G01C 17/38* (2006.01)
(52) U.S. Cl. .......................................................... 702/94
(58) Field of Classification Search .................. 702/89, 702/94, 95, 145, 150, 151; 318/605, 652, 318/661, 700
See application file for complete search history.

(56) References Cited

U.S. PATENT DOCUMENTS

| | | | |
|---|---|---|---|
| 3,735,391 A | 5/1973 | Games et al. | |
| 5,155,696 A | 10/1992 | Shibata et al. | |
| 5,760,562 A | 6/1998 | Woodland et al. | |
| 5,912,638 A | 6/1999 | Vlahu | |
| 5,949,359 A | 9/1999 | Vlahu | |
| 6,084,376 A | 7/2000 | Piedl et al. | |
| 6,255,794 B1 | 7/2001 | Staebler | |
| 6,389,373 B1 | 5/2002 | Ohya | |
| 6,525,502 B1 | 2/2003 | Piedl et al. | |
| 6,744,230 B2 | 6/2004 | Hill et al. | |
| 7,012,399 B2 | 3/2006 | Suzuki | |
| 7,015,840 B2 | 3/2006 | Takehara | |
| 7,047,145 B2* | 5/2006 | Ishizuka et al. | 702/94 |
| 7,294,988 B2* | 11/2007 | Ajima et al. | 318/712 |
| 7,362,070 B2 | 4/2008 | Games et al. | |
| 7,469,193 B2* | 12/2008 | Cheng | 702/94 |
| 2004/0085039 A1 | 5/2004 | Games et al. | |
| 2005/0033539 A1* | 2/2005 | Ishizuka et al. | 702/94 |
| 2008/0116842 A1* | 5/2008 | Cheng et al. | 318/807 |

FOREIGN PATENT DOCUMENTS

WO 2004/042910 5/2004

OTHER PUBLICATIONS

"synchronize" definition, TheFreeDictionary, printed Dec. 21, 2010.*

* cited by examiner

*Primary Examiner* — Michael Nghiem (57) ABSTRACT

A system and method for compensating a resolver are disclosed. Briefly described, one embodiment receives at least one output signal from the resolver, the resolver detecting a current position of a rotor coupled to the resolver; determines if the current position of the rotor is detected by a first pole-pair of the resolver or if the current position is detected by a second pole-pair of the resolver; in response to determining that the current position of the rotor is detected by the first pole-pair, synchronizes the output signal from the resolver with a first resolver angle error information; and in response to determining that the current position of the rotor is detected by the second pole-pair, synchronizes the output signal from the resolver with a second resolver angle error information.

20 Claims, 8 Drawing Sheets

FIG. 8

METHOD AND APPARATUS FOR RESOLVER COMPENSATION

REFERENCE TO RELATED APPLICATION

This application is a divisional of U.S. application Ser. No. 11/601,606 filed on Nov. 16, 2006, now U.S. Pat. No. 7,469,193 issued on Dec. 23, 2008.

BACKGROUND

1. Field

The present disclosure generally relates to motor control and, more particularly, relates to resolvers operable to detect motor speed.

2. Description of the Related Art

The permanent magnet (PM) synchronous motor possesses many appealing characteristics for various applications, including pure-electric or hybrid-electric vehicles. Interior permanent magnet (IPM) synchronous motors are used in some electric vehicle traction drives due to their positive features, such as high efficiency and high power density. Such applications require the motor drives to work in a wide speed range while maintaining high efficiency.

Control systems are used to accurately control operation of the electric motors. One input to such control systems is rotor angular position information. Rotor angle may be detected by a resolver. A resolver is an electromechanical device that detects rotor angle and outputs information corresponding to the detected rotor angle. Some types of resolvers are single or multiple pole-pair machines. Exemplary machine-type resolvers may be physically coupled to the rotor shaft or may be coupled to the rotor shaft with a gear or the like.

Output of a resolver is an electrical signal that corresponds to rotor angle. One exemplary type of resolver outputs a sine wave and a cosine wave that are provided to a resolver-to-digital (R/D) converter, which converts the sine/cosine analog output of the resolver into a digital signal corresponding to the rotor's absolute angular position. The digital signal may be used as an input to the control system that controls operation of the motor.

Machine-type resolvers may be single pole-pair or multiple pole-pair machines. A single pole-pair resolver outputs a signal that is directly proportional to the angular position of the rotor. For example, the output of a single pole-pair resolver may correspond to the rotor's mechanical angle from zero degrees (0°) to 360°, or 2π radians. A single pole-pair resolver would output a signal corresponding to 0° to 360° of electrical angle, where the output electrical angle corresponds to the angular position of the rotor. With a two pole-pair resolver, one mechanical revolution of the rotor (0° to 360°) would cause the resolver to output a signal corresponding to 0° to 720° of electrical angle. Electrical output of multiple pole-pair resolvers may be generally represented as the number of pole-pairs (n) times 360° (n×360°) or the number of pole-pairs times 2π radians (n×2π) for one revolution of the rotor. Speed and/or acceleration of the rotor, and hence the motor, may be determined by observing rotor angle change with respect to time.

Figure 1:
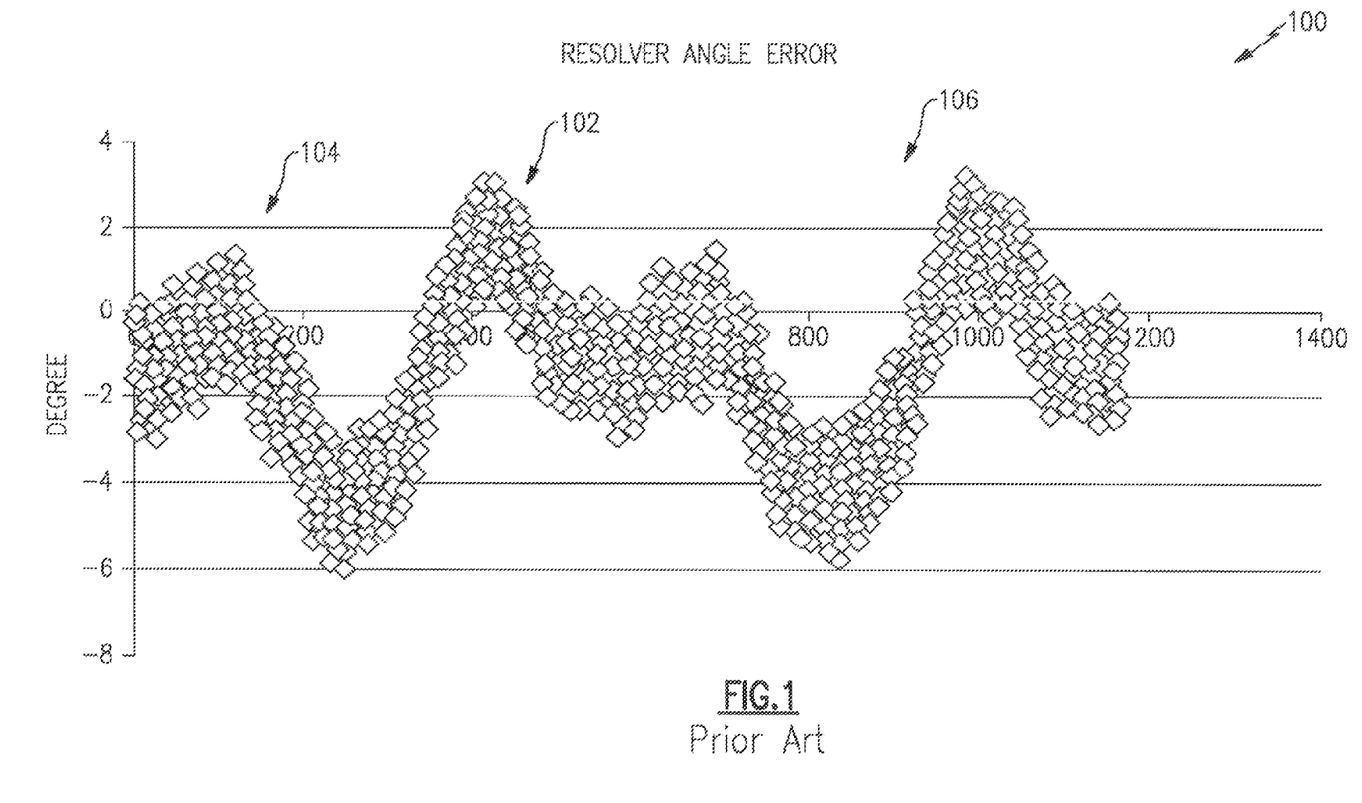
FIG. 1 is a graph illustrating an exemplary resolver output angle error signal from a machine-type two pole-pair resolver.

Various sources of angle error in the output signal of the resolver occur. Such error may arise from mechanical and/or electrical characteristics of the resolver and/or rotor. FIG. 1 is a graph 100 illustrating an exemplary resolver output angle error curve 102 from a two pole-pair resolver (not shown).

Four observations may be made regarding the output angle error of the exemplary two pole-pair resolver. First, in the ideal case of an accurate resolver, the output angle error curve would typically be on the zero axis. The relative distance of the output angle error curve 102 from the zero axis, at any given point, indicates an amount of resolver output angle error at the corresponding angular position of the rotor.

Second, the envelope of first half 104 of the output angle error curve 102 typically does not match the envelope of the second half 106 of the output angle error curve 102. That is, error in the output signal of the resolver generated by the first pole-pair and the second pole-pair, at any given point on the output angle error curve 102, are different.

Third, the period of the first half 104 of the output angle error curve 102 typically does not match the period of the second half 106 of the output angle error curve 102. That is, the length of the first half 104 and the second half 106 of the output angle error curve 102 are different.

Fourth, noise typically induces additional error in the resolver output signal, which is visible as the "width" of the output angle error curve 102. The width of the illustrated output angle error curve 102 corresponds to noise. Noise induced error is not constant over a single rotation of the rotor. In the ideal case of a noiseless resolver, the width of the output angle error curve 102 would be relatively narrow.

The above-described errors in the output angle error curve 102 may arise from a variety of reasons. For example, in the machine-type two pole-pair resolver case, a slight misalignment between the rotor and the stator may result in periodic nonlinear angle measurement errors and differences between the length of the first half 104 and the second half 106 of the output angle error curve 102. Differences in winding turns, winding lengths, and winding orientation of the winding around the pole-pairs of a machine-type resolver will cause errors in the output angle error curve 102. Variations in the physical shape and/or electrical characteristics of the rotor may also appear as errors in the output angle error curve 102. Electrical circuits associated with the resolver, which may be out of tune and/or miscalibrated, may also cause errors in the output angle error curve 102. Other sources of angle error are known, and are not described in detail herein for brevity.

Existing motor control methods and apparatus, particularly in PM or IPM motors used in electric or hybrid vehicle applications, may perform poorly when the resolver does not provide accurate rotor angular position information. That is, motor torque or vehicle torque may be difficult to control and therefore, speed and acceleration of the vehicle may, in turn, be difficult to control if accurate rotor angle cannot be accurately and/or reliably determined because of resolver error. Accordingly, a more accurate resolver method and apparatus is desirable.

BRIEF SUMMARY OF THE INVENTION

A system and method for compensating angle error in an output of a resolver are disclosed. According to one embodiment, a method comprises receiving at least one output signal from the resolver, the resolver detecting a current angular position of a rotor coupled to the resolver; determining if the current angular position of the rotor is detected by a first pole-pair of the resolver or if the current angular position is detected by a second pole-pair of the resolver; in response to determining that the current angular position of the rotor is detected by the first pole-pair, synchronizing the output signal from the resolver with a first resolver angle error information; and in response to determining that the current angular position of the rotor is detected by the second pole-pair, synchronizing the output signal from the resolver with a second resolver angle error information.

According to another embodiment, a system that compensates a resolver output signal that corresponds to at least an angular position of a rotor comprises a rotor residing in a motor, a resolver operable to output a signal corresponding to a current angular position of the rotor, a first pole-pair of the resolver operable to generate a first portion of the output signal, a second pole-pair of the resolver operable to generate a second portion of the output signal, a memory, and a processor. The memory comprises a first portion of compensation information corresponding to resolver angle error of the first pole-pair and a second portion of compensation information corresponding to resolver angle error of the second pole-pair. The processor is operable to receive the output signal from the resolver and is operable to generate a compensated output signal by compensating the first portion of the output signal from the first pole-pair with the first portion of compensation information and by compensating the second portion of the output signal from the second pole-pair with the second portion of compensation information.

According to yet another embodiment, a system that compensates a resolver output signal that corresponds to at least an angular position of a rotor, wherein a first portion of the resolver output signal is generated by a first pole-pair of the resolver, and wherein a second portion of the resolver output signal is generated by a second pole-pair of the resolver, a means to determine a first amount of resolver angle error associated with a first portion of the angular position of the rotor; a means to determine a second amount of resolver angle error associated with a second portion of the angular position of the rotor; a means to generate an output $[\theta_{raw}(k)]$ signal from a resolver coupled to the rotor; and a means to generate a compensated output $[\theta(k)]$ signal by compensating the $\theta_{raw}(k)$ signal with the first amount of resolver angle error when a current angular position of the rotor corresponds to the first amount of resolver angle error, and by compensating the $\theta_{raw}(k)$ signal with the second amount of resolver angle error when the current angular position of the rotor corresponds to the second amount of resolver angle error.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments. However, one skilled in the art will understand that the embodiments may be practiced without these details. In other instances, well-known structures associated with resolvers, permanent magnet (PM) motors, controllers, processors, and various electrical components have not been shown or described in detail to avoid unnecessarily obscuring descriptions of the embodiments.

Unless the context requires otherwise, throughout this specification and claims which follow, the word "comprise" and variations thereof, such as "comprises" and "comprising," are to be construed in an open, inclusive sense, that is as "including, but not limited to."

The headings provided herein are for convenience only and do not interpret the scope or meaning of the claimed invention.

Figure 2:
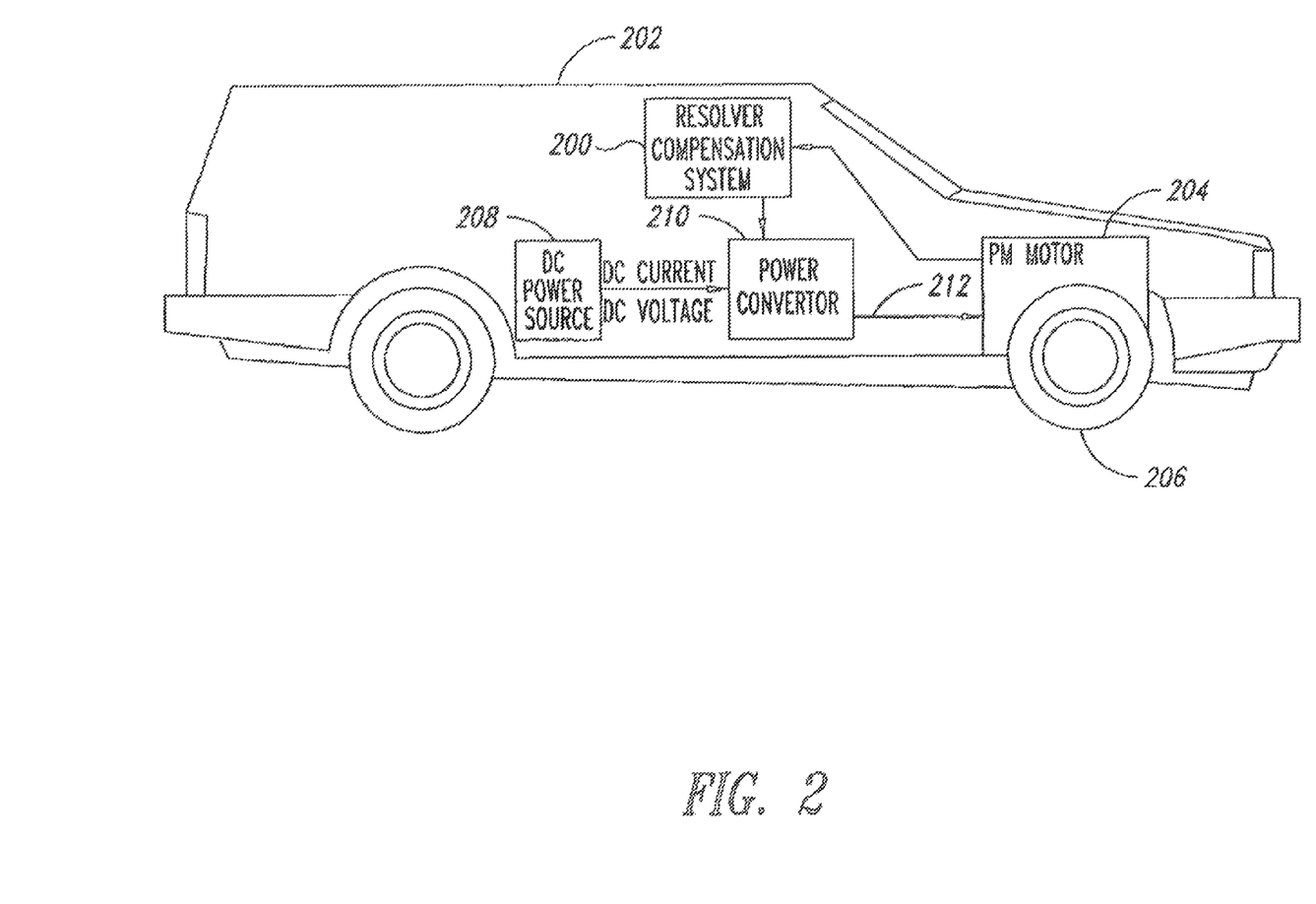
FIG. 2 is a schematic diagram of a resolver compensation system implemented in an electric or hybrid vehicle.

FIG. 2 is a schematic diagram of a resolver compensation system 200 implemented in an electric or hybrid vehicle 202. The exemplary resolver compensation system 200 provides, in part, control signals corresponding to rotor angular position for operation of a permanent magnet (PM) motor 204 mechanically coupled to drive at least one wheel 206. In the various embodiments, the motor 204 may be a PM traction motor, an interior permanent magnet (IPM) traction motor, or another suitable electric machine. Further, such machines may be operable in a generation mode, such as during regenerative braking operations.

The vehicle 202 includes a direct current (DC) power source 208, for example, a battery, fuel cell system, and/or super-capacitor, which is electrically coupled to the motor 204 by way of a power converter 210. The power converter 210 supplies alternating current (AC) to the motor 204 to control motor speed and/or acceleration, via connection 212.

Motor Control System

Figure 3:
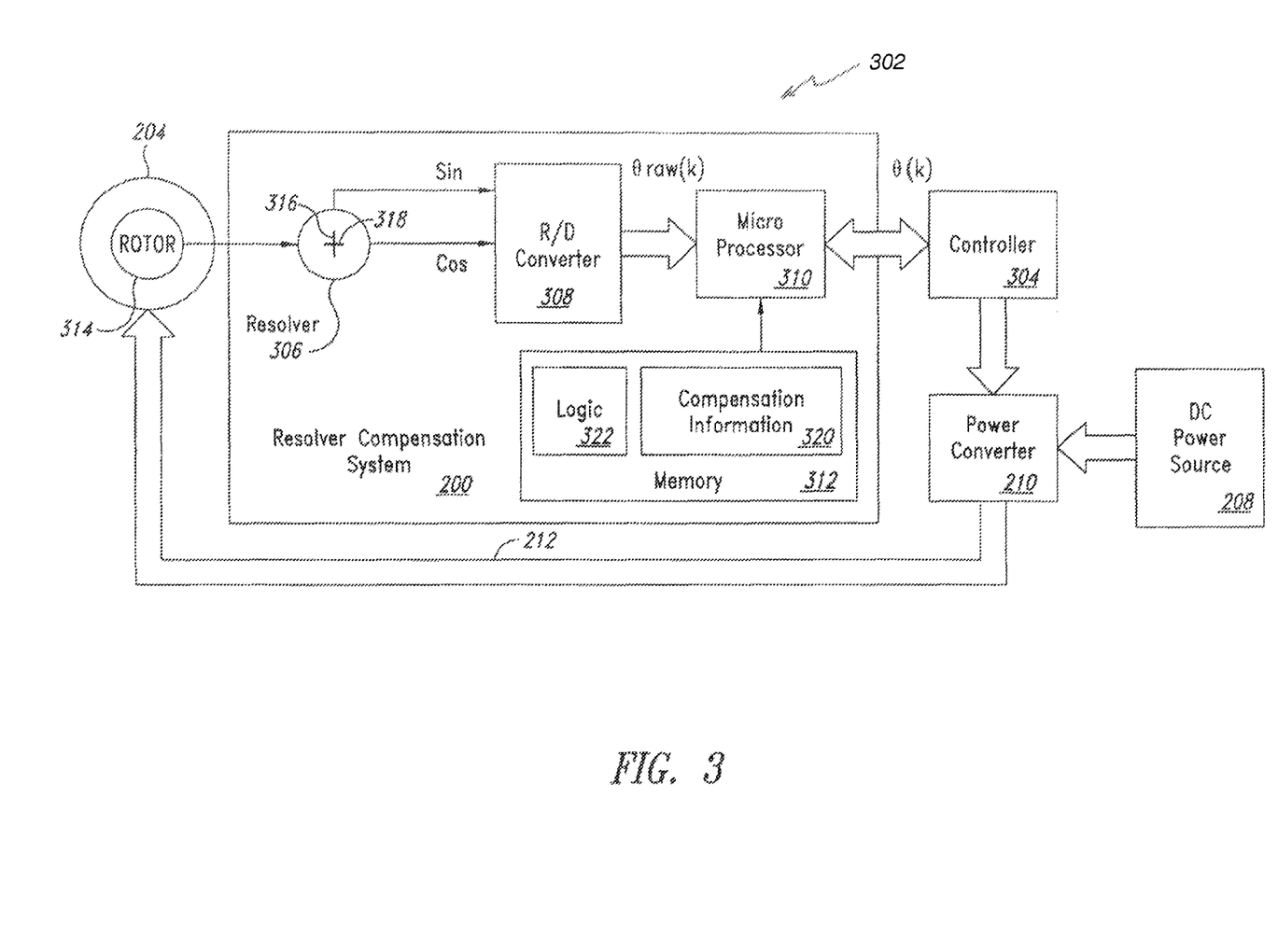
FIG. 3 is a block diagram of an exemplary embodiment of a resolver compensation system which converts direct current (DC) power into alternating current (AC) power to drive the motor of a vehicle.

FIG. 3 is a block diagram of an exemplary embodiment of a motor control system 302 controlling the conversion of DC power into AC power to drive the motor 204. The exemplary motor control system 302 comprises a resolver compensation system 200, a power converter 210, a DC power source 208, and a controller 304. The exemplary embodiment of the resolver compensation system 200 comprises a resolver 306, a resolver-to-digital (R/D) converter 308, a processor 310, and a memory 312.

Resolver 306 receives information from the motor 204 such that angular position of the rotor 314 is determined from its output sine and cosine signals that correspond to angular position (angle) of the rotor 314. The exemplary embodiment of the resolver 306 is a machine-type two pole-pair resolver physically coupled to a shaft of the rotor 314. The exemplary resolver 306 outputs the analog sine wave and cosine wave angle signals to the R/D converter 308. Other resolver embodiments may output other types of signals corresponding to angular position of rotor 314.

R/D converter 308 samples the sine and cosine analog outputs of the resolver into a suitable digital signal [$\theta_{raw}(k)$] that is communicated to processor 310. In one embodiment, R/D converter 308 outputs a signal corresponding to the rotational speed of the rotor 314. In another embodiment, R/D converter 308 outputs a signal corresponding to the absolute angular position of the rotor 314. The sampling rate "1/T", where T is the sampling time, used to generate the digital resolver output signal [$\theta_{raw}(k)$] at kT time interval may be relatively high, from between 8 thousand hertz (KHz) and 12 KHz.

R/D converter 308 communicates the digitized resolver signal $\theta_{raw}(k)$ to the processor 310. The processor 310 determines angular position, speed and/or acceleration as needed from the received signal $\theta_{raw}(k)$.

Processor 310 outputs an output signal [$\theta(k)$] that is communicated to the controller 304. The output signal $\theta(k)$ from processor 310 is based upon the received signal $\theta_{raw}(k)$ from the R/D converter 308. Other optional signals (not discussed herein for brevity) may be used as supplemental inputs to processor 310 such that processor 310 outputs other signals that may be used to control operation of the power converter 210 and/or other devices. Power converter 210 converts DC power received from the DC source 208, or power received from another suitable source (not shown), into AC current that is communicated to the motor 204.

Various types of power converters 210, DC power sources 208, and/or controllers 304 may be used to provide AC current to motor 204. Such devices are well known in the arts. Accordingly, the various possible power converters 210, DC power sources 208, controllers 304, and motors 204 that may be used in vehicle 202 (FIG. 2), their respective operational processes, and other components (not shown), are not described in detail herein for brevity.

Resolver Angle Error

The exemplary resolver 306 is a machine-type two pole-pair resolver. Resolver 306 outputs a signal that corresponds to angular position of rotor 314. With the exemplary two pole-pair resolver 306, one mechanical rotation of the rotor 314, from 0° to 360°, causes the resolver 306 to output a signal corresponding to an electrical angle of 0° to 720°, or 4π radians. A first portion of the output signal from resolver 306 is generated by a first pole-pair 316. A second portion of the output signal is generated by a second pole-pair 318.

Figure 4A:
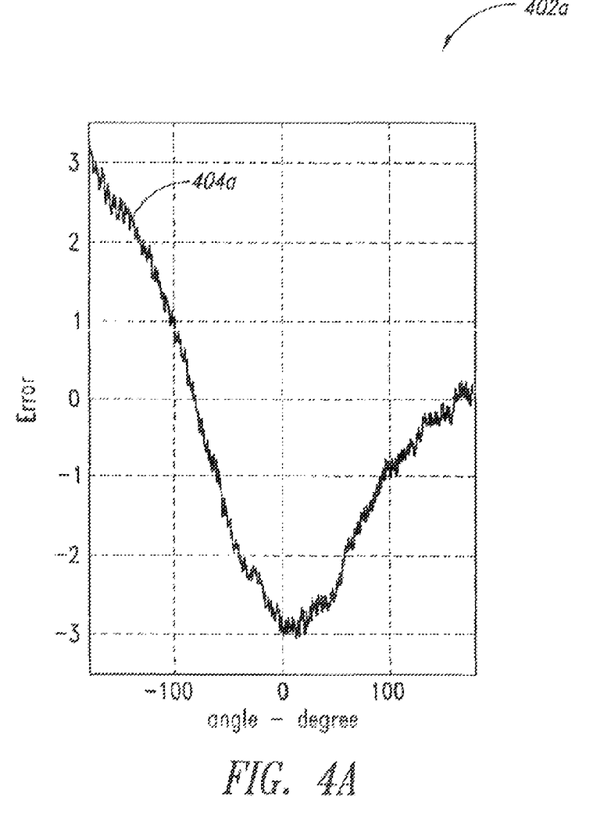
FIGS. 4A and 4B are graphs conceptually depicting the resolver angle error of the resolver output signal for the first pole-pair and the second pole-pair of a machine-type two pole-pair resolver.
Figure 4B:
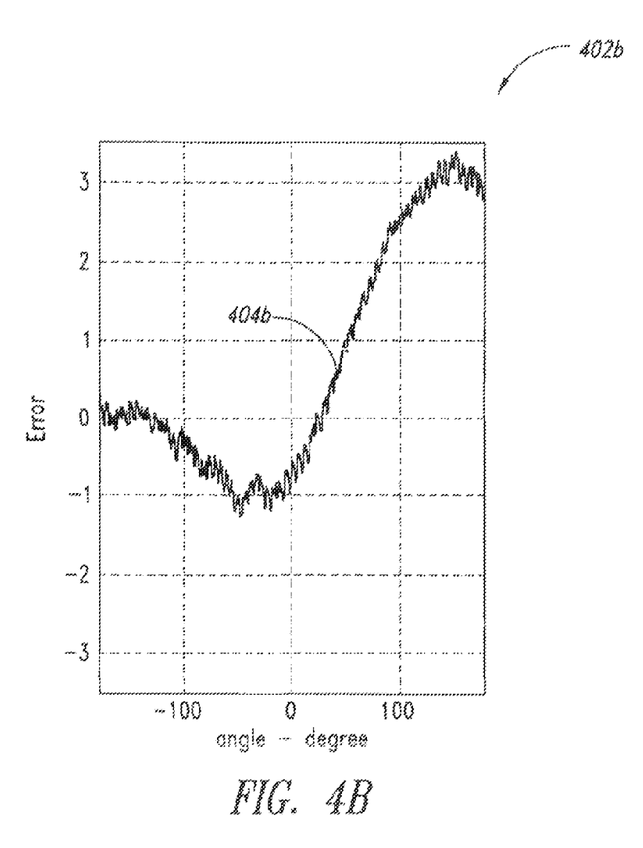

As noted above, the output of resolver 306 may include some level of inherent periodic nonlinear angle error in its output signal. FIGS. 4A and 4B are graphs conceptually depicting the angle error of the resolver output signal for the first pole-pair 316 and the second pole-pair 318 of the exemplary machine-type two pole-pair resolver 306.

The graph 402a illustrates an exemplary angle error curve 404a for the first pole-pair 316 (FIG. 3) of the resolver 306. The graph 402b illustrates an exemplary resolver angle error curve 404b for the second pole-pair 318 of the resolver 306. The angle error curves 404a and 404b may be determined by testing.

The illustrative angle error curve 404a associated with the first pole-pair 316 is different from the angle error curve 404b associated with the second pole-pair 318. Embodiments of the resolver compensation system 200 recognize that resolver angle error will be different for each pole-pair, at least to some degree, in a mechanical-type multiple pole-pair resolver. Further, the resolver angle error for any individual resolver will be unique.

Further, embodiments of the resolver compensation system 200 recognize that the angle error associated with each resolver pole-pair 316, 318 is periodic and repeatable. That is, for each period that the first pole-pair 316 is generating its respective portion of the output signal from the resolver 306, the resolver signal angle error is the same for each subsequent period that the first pole-pair 316 is generating its respective portion of the output resolver signal. Similarly, for each period that the second pole-pair 318 is generating its respective portion of the output signal from the resolver 306, the resolver signal angle error is also the same for each period that the second pole-pair 318 is generating its respective portion of the output signal. Accordingly, the output signal of the resolver 306 will be periodically and repetitively distorted by the exemplary angle error curve 404a and by the exemplary angle error curve 404b.

The above-described resolver angle error for the first pole-pair 316 and the second pole-pair 318 distorts the angular position signal communicated from the resolver 306 to the R/D converter 308. Accordingly, the output signal $\theta_{raw}(k)$ communicated from the R/D converter 308 to the processor 310 is similarly distorted by the resolver angle error. The processor 310, using a priori knowledge of the resolver angle error for the first pole-pair 316 and the second pole-pair 318, stored as compensation information 320 in memory 312, compensates the sensed rotor angular position with the compensation information 320 such that a compensated rotor angular position signal $\theta(k)$ is communicated to the controller 304.

That is, when the output rotor angular position signal is generated from the first pole-pair 316, processor 310 compensates the received rotor angular position output signal $\theta_{raw}(k)$ using compensation information 320 corresponding to the first angle error curve 404a that is stored in memory 312. When the output rotor angular position signal is generated from the second pole-pair 318, processor 310 compensates the received rotor output angular position signal $\theta_{raw}(k)$ using the compensation information 320 corresponding to the second angle error curve 404b.

Summarizing, the resolver compensation system 200 (FIG. 3) comprises compensation information 320, described in greater detail hereinbelow, corresponding to the above-described inherent angle error of the resolver 306. This compensation information 320 is used by processor 310 to compensate the output signal $\theta(k)$ that is provided to controller 304 such that controller 304 receives more accurate angular position information for the rotor 314.

Resolver Error Compensation Tables

In various embodiments, the above-described compensation information 320, determined from testing, is processed into a data structure format suitable for storage into memory 312. Processor 310, executing logic 322, determines the electrical and/or mechanical angular position of the resolver 306. The compensation information 320 corresponding to the resolver angle error is retrieved from memory 312 and is used to compensate the information received from the R/D converter 308.

In one embodiment, the compensation information 320 stores resolver angle information as a data structure in the form of a look up table or the like. Since the compensation information 320 may be quickly retrieved and used to compensate the incoming rotor angular position information, the resolver angle error can be compensated on a real-time or near real-time basis. Accordingly, the controller 304 is operable to control the power converter 210 using accurate angular position information for the rotor 314.

In the above-described exemplary two pole-pair resolver 306, two distinct resolver angle graphs 402a and 402b were determined based upon testing. In one embodiment, two separate data tables are determined and stored separately as the compensation information 320. In other embodiments, resolver error angle information determined from the two distinct resolver angle graphs 402a and 402b may be stored as a single table using a different type of suitable identifier that distinguishes information corresponding to the two distinct resolver angle graphs 402a and 402b.

Determining Resolver Alignment At Initialization

If the correct compensation information 320 is to be retrieved from memory 312, during initialization the compensation system 200 must first determine which pole-pair is generating the current output signal of the resolver 306 and must determine the precise pole-pair angular position. That is, the compensation system 200 does not initially know whether the resolver signal currently received from the R/D converter 308 is being generated by the first pole-pair 316 or the second pole-pair 318. Once the processor 310 knows which pole-pair is generating the currently received resolver signal, the precise angular position of the resolver pole-pair is determined so that the correct compensation information 320 for that pole-pair can be retrieved. That is, the pole-pair and the angular position of the resolver are to be synchronized with the compensation information 320.

As noted above, the compensation information 320 determined from the two distinct resolver angle graphs 402a and 402b is separately stored into memory 312. If the compensation information 320 is not properly synchronized with the currently received resolver signal, compensation of the resolver signal with resolver angle error from a pole-pair that is not currently generating the resolver signal will result in a signal output that has an exacerbated, aggravated, and/or relatively large angle error. However, if the compensation information 320 is properly synchronized with the currently received resolver signal, compensation of the resolver signal with resolver angle error from the pole-pair that is currently generating the resolver signal will result in a signal output that has an improved and/or relatively low angle error.

In one embodiment, the received resolver output signal $\theta_{raw}(k)$ from the first pole-pair 316 is compensated with the compensation information 320 corresponding to the first resolver angle error graph 402a, and $\theta_{raw}(k)$ from the second pole-pair 318 is also compensated with the compensation information 320 corresponding to the second resolver angle error graph 402b. A standard deviation is calculated based upon the above-described compensation.

The output signal $\theta_{raw}(k)$ from the first pole-pair 316 is compensated with the compensation information 320 corresponding to the second resolver angle graph 402b, and $\theta_{raw}(k)$ from the second pole-pair 318 is also compensated with the compensation information 320 corresponding to the first resolver angle error graph 402a A second standard deviation is calculated based upon the above-described compensation.

The lowest one of the two above-described standard deviations indicates the correct compensation information 320 which corresponds to the angular position of the rotor 314. This embodiment is described in greater detail hereinbelow.

In another exemplary embodiment, before compensated rotor angular position information is provided to the controller 304, the processor 310 compensates the received resolver output signal $\theta_{raw}(k)$ with compensation information 320 from one of the two distinct resolver angle graphs 402a and 402b. The resulting compensated output signal $\theta(k)$ is statistically analyzed. If the resulting compensated output signal $\theta(k)$ has an error that is below a threshold, at least in a statistically meaningful manner, the processor 310 determines that the resolver 306 has been correctly synchronized with the compensation information 320. Conversely, if the resulting compensated output signal $\theta(k)$ has an error that is above the threshold, at least in a statistically meaningful manner, the processor 310 determines that the resolver 306 has not been correctly synchronized with the compensation information 320.

Any suitable signal analysis process that allows processor 310 to determine whether the resolver 306 has been correctly synchronized with the compensation information 320 may be used by various embodiments. Such suitable signal analysis processes used to determine whether the resolver 306 has been correctly synchronized with the compensation information 320 are too numerous to describe in detail and, accordingly, are not described herein for brevity. All such suitable signal analysis processes are intended to be within the scope of this disclosure.

Figure 5:
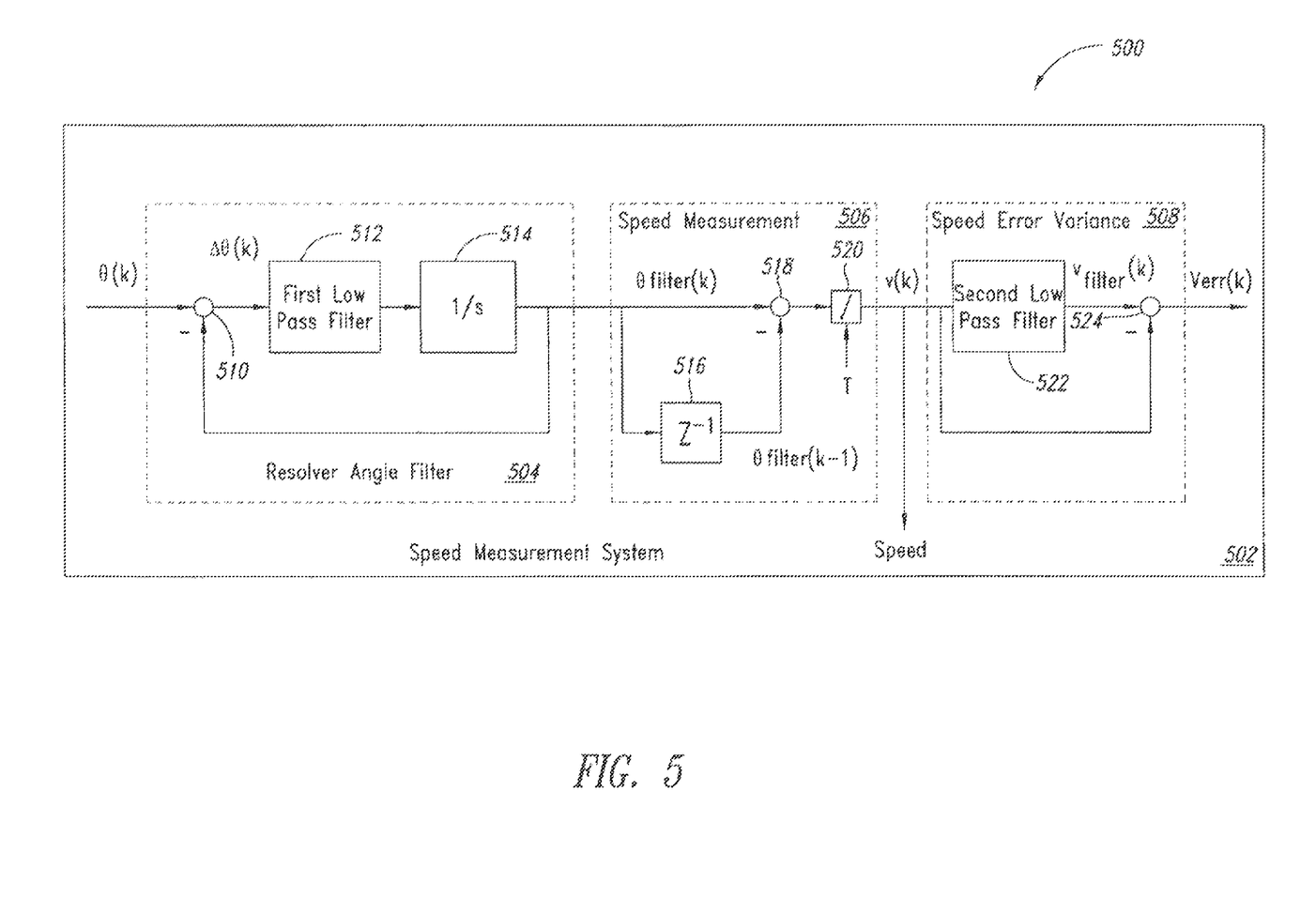
FIG. 5 is a block diagram of an exemplary speed measurement system employed by an embodiment of the resolver compensation system.

FIG. 5 is a block diagram 500 of an exemplary speed measurement system 502 employed by an embodiment of the resolver compensation system 200. The block diagram illustrates a resolver angle filter block 504, a speed measurement block 506, and a speed error variance block 508. All or part of the control system 502 may be implemented using any suitable logic executed by microprocessor 310 (FIG. 3), implemented as hardware, or implemented as a combination of hardware and firmware.

The resolver angle filter block 504 filters a received resolver angle $\theta_{raw}(k)$. The speed measurement block 506 determines speed V(k). The speed error variance block 508 determines an error variance $V_{err}(k)$ of the speed V(k).

As noted above, embodiments of the R/D converter 308 may generate the output signal $\theta_{raw}(k)$ corresponding to rotor position. The resolver angle filter block 504 comprises a summing node 510, a first low pass filter 512, and an integrator block 514. The speed measurement block 506 comprises a delay block 516, a first summing junction 518, and a division block 520. The speed error variance block 508 comprises a second low pass filter 522 and a second summing junction 524.

Due to the above-described nonlinear resolver angle error, a speed signal may contain speed ripples caused by random noise. The filtered resolver angle, speed and error variance of the speed measurement system 502 removes the random noise related angle and speed ripples from the resolver output.

In the various embodiments, the resolver output signal is sampled by the R/D converter 308 at a very high rate. One embodiment samples the output of resolver 306 at a rate between 8 KHz and 12 KHz. Thus, the angle difference with each sampling period will not change abruptly. A low pass filter is applied to the angle difference and then an integration is applied to the filter output to get the filtered angle signal $\theta_{filter}(kT)$. Given a sampling time T, speed is determined from equation (1) below:

$$\text{Speed} = \frac{q_{filter}(kT) - q_{filter}((k-1)T)}{T} \quad (1)$$

A speed variance is then calculated over a complete mechanical cycle of the rotor 314 from equation (2) below:

$$\sigma^2 = \frac{1}{n}\sum_{k=1}^{n}(v(k) - v_{filter}(k))^2 \quad (2)$$

In one embodiment, a first speed variance is calculated where one set of compensation information 320 is selected (for example, initializing with information corresponding to resolver angle graph 402a and then by 402b). Then, a second speed variance is calculated where the second set of compensation information 320 is selected (for example, initializing with information corresponding to resolver angle graph 402b and then by 402a). The lower value of the first and second speed variance indicates the order in which the information corresponding to the angle graphs 402a and 402b should be used to compensate the resolver angle. Once compensation information 320, started correctly from one of the two distinct resolver angle graphs 402a and 402b, is synchronized with the received resolver output signal, resolver angle error compensation can begin at the next known point in the electrical or mechanical cycle, such as at the start of a cycle.

During initialization, if the wrong order of the compensation information 320 corresponding to the angle graph 402a and 402b is selected (corresponding to initializing from one of the two distinct resolver angle graphs 402a and 402b), the resultant speed ripples, and hence the variance, in the compensated speed signal will be relatively large (greater than a threshold, for example). Accordingly, it is understood that the wrong compensation information 320 (the order of selection of the information corresponding to the angle graphs 402a and 402b) has been used to compensate the resolver angle. If the order of the compensation information is reversed (starting from the other one of the two resolver angle graphs 402a and 402b), the resultant speed ripples will be relatively small (less than the threshold, for example). Accordingly, it is understood that the correct compensation information 320 (the order of selection of the information corresponding to the angle graphs 402a and 402b) has been used to compensate the resolver angle.

In an alternative embodiment, the resolver angle is initially compensated with compensation information 320 based upon a first set of compensation information 320 (for example, initializing with information corresponding to resolver angle graph 402a and then by 402b) and a variance is calculated. The variance is compared to a threshold. If the variance is less than the threshold, it is understood that the compensation is synchronized with the resolver output signal. If the variance is greater than the threshold, it is understood that the compensation is not synchronized with the resolver output signal. (Accordingly, the resolver signal is compensated with the second set of compensation information 320, for example, initializing with information corresponding to resolver angle graph 402b and then by 402a).

Once compensation information, started correctly from one of the two distinct resolver angle graphs 402a and 402b, is synchronized with the received resolver output signal, resolver angle error compensation can begin at the next known point in the electrical or mechanical cycle, such as at the start of a cycle.

Resolver Compensation Processing System

Figure 6:
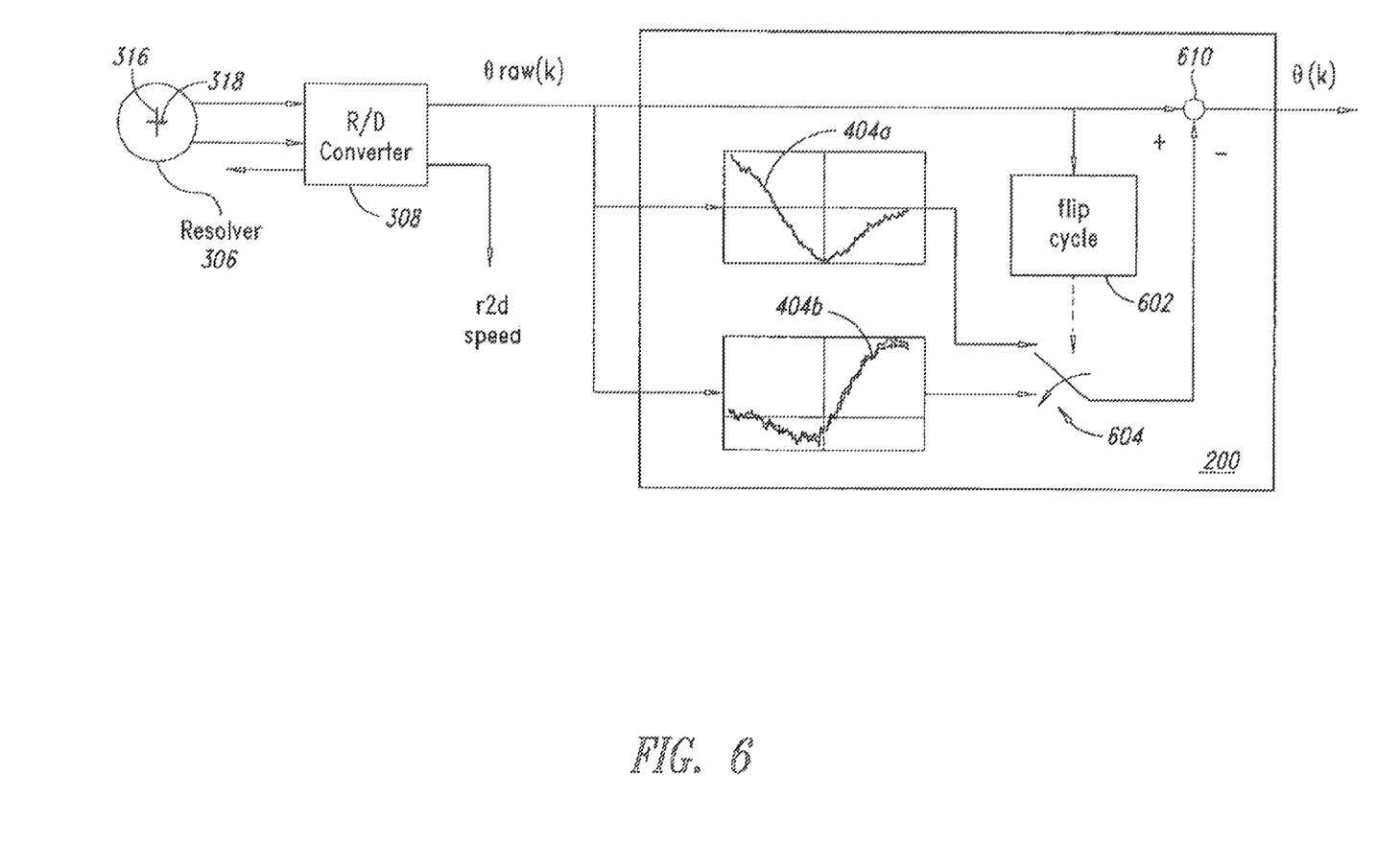
FIG. 6 illustrates an embodiment of a resolver compensation system employing a flip cycle block to distinguish between the two distinct resolver angle graphs of FIGS. 4A and 4B.

FIG. 6 illustrates an embodiment of a resolver compensation system 200 employing a flip cycle block 602. Flip cycle block 602 distinguishes between the two distinct resolver angle graphs 402a and 402b (FIGS. 4A and 4B, respectively) when the resolver compensation system 200 initializes. Flip cycle block 602 receives the output signal $\theta_{raw}(k)$ of the R/D converter 308 and analyzes the output signal as described above. For convenience, the compensation information 320 is graphically illustrated as the two distinct resolver angle graphs 402a and 402b. As noted above, the compensation information 320 is stored as a look up table or in another suitable format.

For convenience, the flip cycle block 602 is illustrated as controlling the logic switch 604. For convenience, the compensation information 320 corresponding to the resolver angle error graph 402a has been arbitrarily selected by the logic switch 604. If the flip cycle block 602 is implemented as logic, selection of the resolver error angle information for a pole-pair may use a flag or the like, referred to as a flip-cycle flag for convenience. For example, a flip-cycle flag may use the character "0" to represent resolver angle error compensation information 320 of the first pole-pair synchronized with information corresponding to the first resolver angle error graph 402a and the character "1" to represent resolver angle error compensation information 320 for the second pole-pair synchronized with information corresponding to the first resolver angle error graph 402a for a two pole-pair resolver. During initialization, compensation information 320 for one of the pole-pairs could be selected by starting with the flip-cycle flag set to "0" (or "1" in another embodiment), or the flip-cycle flag may be randomly selected.

During initialization, the flip cycle block 602 initially selects compensation information 320 corresponding to resolver angle graph 402a or 402b, and then compensates the input signal $\theta_{raw}(k)$ with the selected compensation information 320. In the illustrative example above, if the compensation information 320 (corresponding to resolver angle graph 402a) does not correspond to the initial angle error signal generated by the first pole-pair 316 of the resolver 306, the compensation information 320 corresponding to the resolver angle graph 402b is selected. That is, if the output signal $\theta(k)$ has not been properly compensated by the compensation information 320, the input signal $\theta_{raw}(k)$ is not in synch with the selected compensation information 320. Accordingly, the flip cycle block 602 initializes the logic switch 604 such that the compensation information 320 corresponding to the other resolver angle graph, here resolver angle graph 402b, is selected.

Once the correct compensation information 320 corresponding to one of the two distinct resolver angle graphs 402a and 402b is initialized (thus correctly synchronizing the input signal $\theta_{raw}(k)$ corresponding to the first pole-pair 316 with the selected compensation information 320), assuming that the resolver 306 is a two pole-pair type resolver, compensation of the resolver output signal can begin. When a new electrical cycle of the resolver 306 starts, the compensation information 320 is retrieved from memory 312 and combined with the corresponding received output signal $\theta_{raw}(k)$ sample point at summing node 610, such that a compensated output signal $\theta(k)$ for that sample point is output to the controller 304 (FIG. 3). Compensation continues on a sample-point-by-sample-point basis through at least one complete mechanical revolution of the rotor 314. The compensation process then restarts as the next mechanical cycle of the rotor 314 starts so that the next cycle of resolver output is compensated using the compensation information 320 corresponding to resolver angle graph 402a or 402b.

It is appreciated that the above-described flag can be initially set at any value, either randomly or by preselection. At a certain, known, and/or predefined speed, the resolver compensation system 200 employing a flip cycle block 602 determines which compensated output is "smaller" and picks that corresponding flag value as the correct initial flag. The above-described initialization process is done once every power cycle, and preferably done at a certain speed, to initialize the flag at the right value.

Resolver Compensation Process

Figure 7:
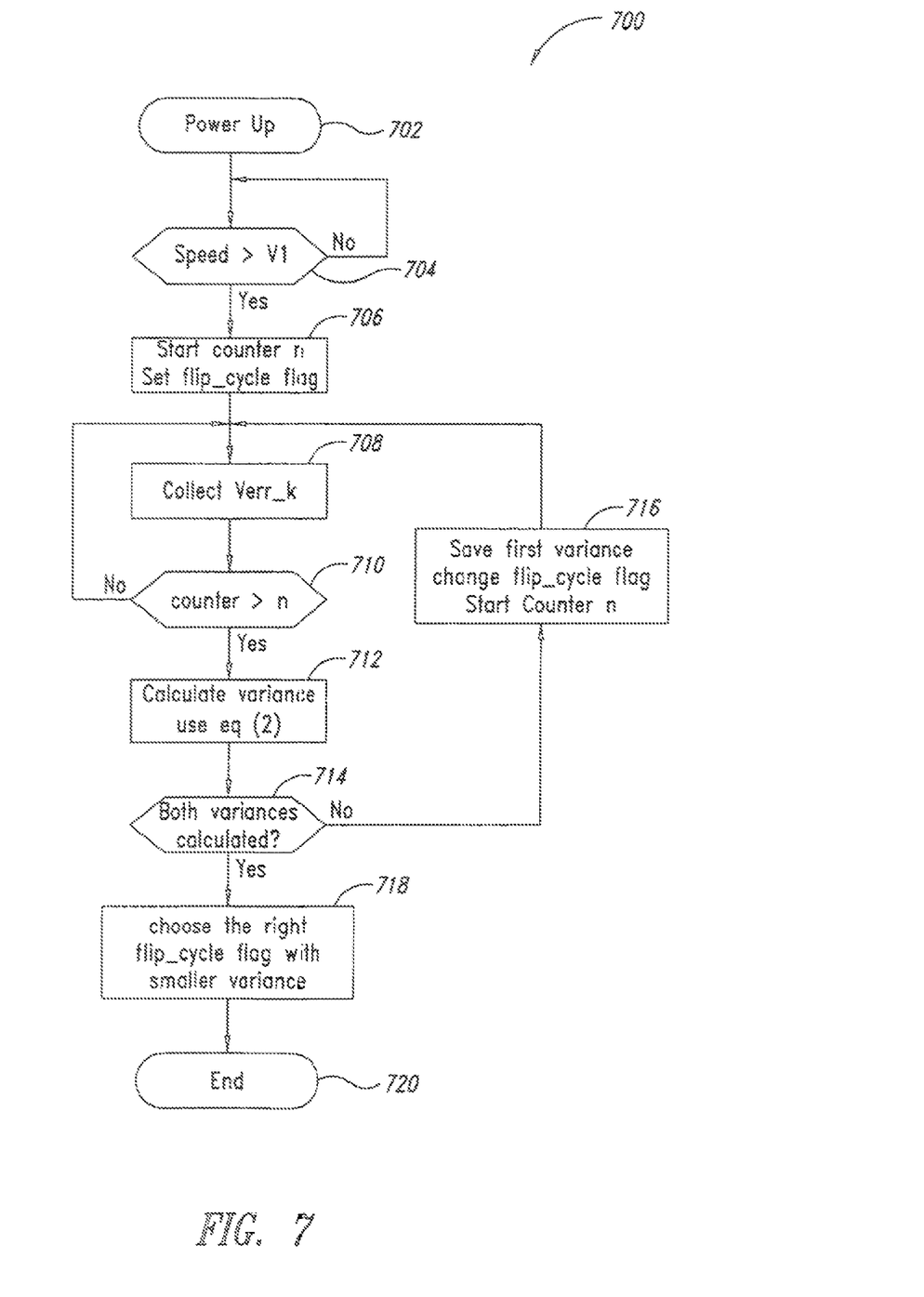
FIG. 7 is a flow chart illustrating an exemplary initialization process of a resolver compensation system.

FIG. 7 is a flow chart 700 illustrating an exemplary initialization process of the resolver compensation system 200. The flow chart 700 shows the architecture, functionality, and operation of a possible implementation of software for implementing initialization for a resolver compensation system 200.

The initialization process starts at power up, at block 702. The resolver compensation system 200 then waits, at block 704, for the speed of motor 204 to exceed a threshold (V1). A flip-cycle flag is initialized to "0" at block 706 to designate the first resolver error information, corresponding to the illustrated resolver angle graph 402a, to the current resolver electric angle input and a counter value is set so that a sample of size "n" is collected for at least a complete mechanical cycle of the rotor. The value of the counter corresponds to a number of data samples for which the output of the R/D converter 308 will be sampled. The value "n" is at least large enough to allow for a complete mechanical cycle of the motor 204.

The error data is collected for each sample "k" at block 708. At block 710, the process loops back to block 708 until the number of sample points "n" has been collected. It is appreciated that the flip-cycle flag will change from "0" to "1" or change from "1" to "0" when the electric cycle changes from one cycle to the other. Accordingly, the exemplary initialization process of flow chart 700 initializes the flip-cycle flag correctly. At block 712 a variance is calculated for the flip-cycle initialized to "0" in accordance with equation (2) above. At block 714, it is determined that variances for both initialization values have not been calculated and the process loops to block 716 where the variance for the first initialized flag value is saved and the flip-cycle flag is changed to "1" to correspond to the second resolver angle error information (corresponding to the illustrated resolver angle graph 402b) lined up with the current resolver electric angle input. The counter is also reset so that a sample of size "n" is collected for at least a complete mechanical cycle of the motor 204.

The process of blocks 708-712 is repeated for the case that the flip-cycle flag equals "1" to designate the second resolver error information (corresponding to the illustrated resolver angle graph 402b) to the current resolver electric angle input. When the variance for the second set of data is calculated at block 712, the process proceeds again to block 714. At this point in the process, it is appreciated that variance for both sets of resolver angle error information (corresponding to the illustrated resolver angle graphs 402a and 402b, and initialized differently as described above) have been calculated. At block 718, the flip-cycle flag with the smaller variance is chosen such that the compensation information is synchronized with the received output signal $\theta_{raw}(k)$ from the R/D converter 308. The initialization process ends at block 720.

Figure 8:
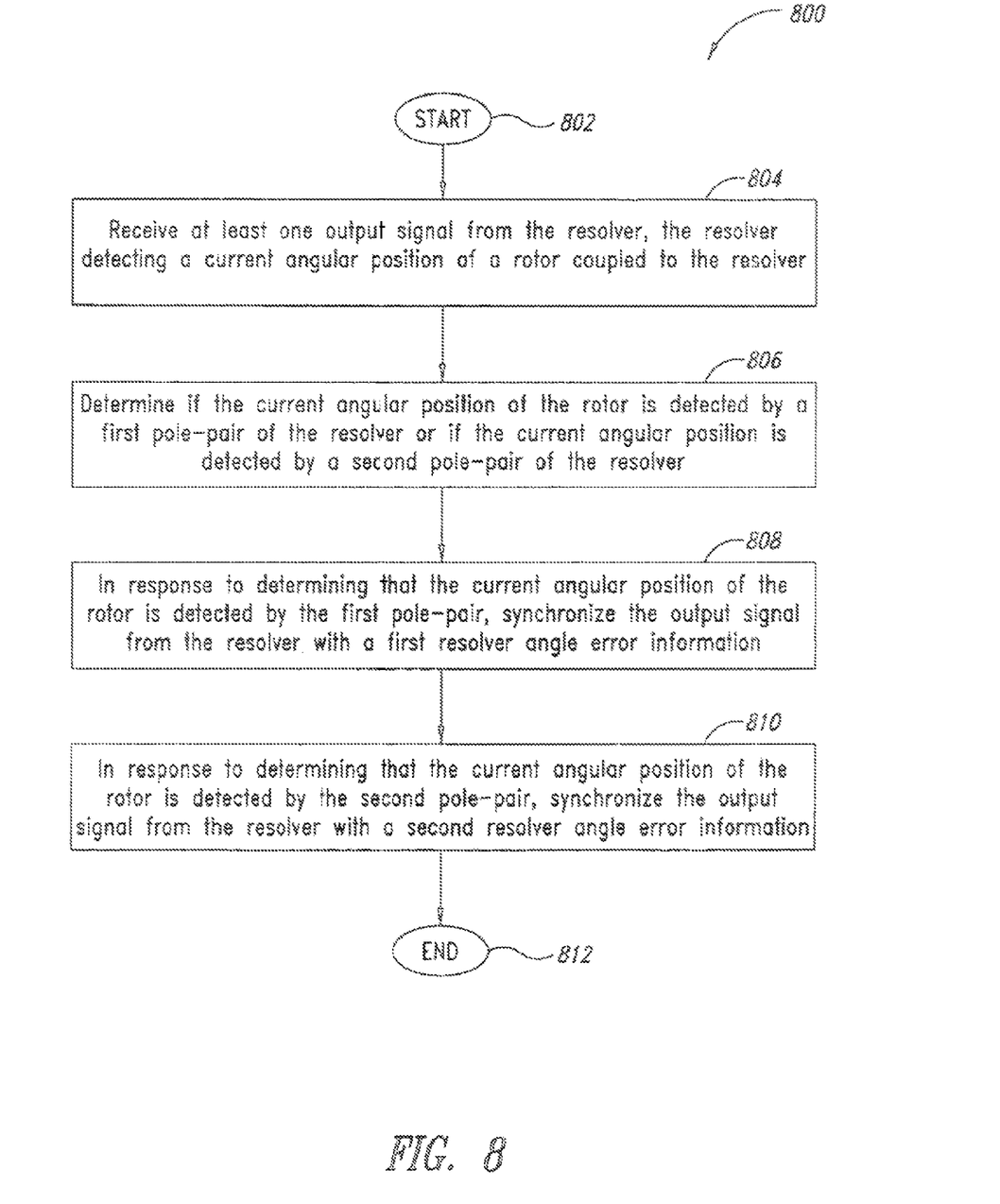
FIG. 8 is a flow chart illustrating an exemplary process of compensating angle error in an output of the resolver of FIG. 2.

FIG. 8 is a flow chart 800 illustrating an exemplary process of compensating angle error in an output of the resolver 306 (FIG. 2). The process starts at block 802. At least one output signal from the resolver 306 is received at block 804, wherein the resolver 306 detects a rotational position (angle) of a rotor 314 coupled to the resolver 306. In one embodiment, both sine and cosine output signals from the resolver are received at block 804. A determination is made whether the current angular position of the rotor 314 is detected by a first pole-pair of the resolver 306 or if the current angular position is detected by a second pole-pair of the resolver 306 at block 806. In response to determining that the current angular position of the rotor 314 is detected by the first pole-pair, the output signal from the resolver 306 is synchronized with a first resolver angle error information at block 808. In response to determining that the current angular position of the rotor 314 is detected by the second pole-pair, the output signal from the resolver 306 is synchronized with a second resolver angle error information at block 810. The process ends at block 812.

With respect to the flow chart 700 (FIG. 7) and the flow chart 800 (FIG. 8), each block may represent a module, segment, or portion of code that comprises one or more executable instructions for implementing the specified logical function(s). It should also be noted that in some alternative implementations, the functions noted in the blocks may occur out of the order noted in FIGS. 7 and/or 8, may include additional functions, and/or may omit some functions. For example, two blocks shown in succession in FIGS. 7 and/or 8 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included within the scope of this disclosure.

Alternative Embodiments

It is appreciated that there may be some unpredictable error for the pole-pairs 316 and 318 as each pole-pair successively generates output signals from the resolver 306. That is, the periodic error from each individual pole-pair may be different each time a pole-pair is repetitively generating its respective portion of the resolver output signal. Accordingly, during the test to determine the compensation information 320 stored in memory 312 (FIG. 3), a plurality of tests for each of the pole-pairs of the resolver may be made and an average resolver angle error for each pole-pair may be determined by averaging corresponding test data sample points. Other embodiments may use characteristic resolver angle error data or a best fit of the resolver angle error test data for each pole-pair. All such alternative embodiments are intended to be included within the scope of this disclosure.

The exemplary resolver angle error curves 404a and 404b are illustrative of the error in the output signal from resolver 306 when tested at a preselected test speed. Resolver angle error may vary at different speeds. Further, differences between the actual rotor speed at the time of compensation and the rotor speed at the time of testing (for determination of the compensation information 320) will result in sampling differences. That is, a predefined sample period will correspond to a first portion of rotor angle rotation at one speed and will correspond to a different portion of rotor angle rotation at a different speed. Thus, if the run-time speed of the rotor 314 is different from the test speed, then the run-time sample period will correspond to a rotor angle rotation portion which will be different from the angle rotation portion of the test sample period. Accordingly, compensation error will occur because the angle error information from the compensation information 320 will not correspond to the rotation portion of the rotor at run time. It is appreciated that error information (corresponding to the illustrated resolver angle graphs 402a and 402b) is preferably collected at a fixed speed. Any speed may be used. However, a slower speed will result in more accurate position error information (corresponding to the illustrated resolver angle graphs 402a and 402b). In use, errors induced at speeds different from those used when the position error information was created will result not from the position error information itself, which is position dependant, but from signal decay or high frequency errors in the resolver.

Accordingly, in some embodiments, the resolver 306 may be tested at different speeds to determine a plurality of different resolver angle error curves, tables, or other suitable compensation information for different speeds. Or, alternative embodiments may use the test data from different speeds to determine a "correction factor" or the like that is applied to a base resolver angle error curve, table, and/or compensation information. For example, interpolation or the like may be used to match the sampling rate at the actual operating rotor speed with the sampling rate of the tested compensation information 320. Other processes may be used so that the output signal of the resolver 306 may be accurately compared with the compensation information 320. Such processes are too numerous to describe herein and are omitted for brevity. All such alternative embodiments are intended to be included within the scope of this disclosure.

The resolver angle error curves 404a and 404b illustrate one exemplary format of resolver angle error. Resolver angle error may be expressed in any suitable format in alternative embodiments. For example, an alternative embodiment may represent the resolver angle error as a higher-order polynomial equation such that compensation information is computationally determined. Further, a higher-order polynomial equation may be adjusted or modified for different operating speeds of the rotor 314. The equation may be stored in any suitable medium and/or as a data structure that models the resolver error angle. All such alternative embodiments are intended to be included within the scope of this disclosure.

The exemplary resolver 306 outputs an analog sine wave signal and an analog cosine wave signal. In alternative embodiments, an analog to digital (A/D) converter may digitize the sine wave and the cosine wave, and then communicate the digitized sine wave and the digitized cosine wave to processor 310. The processor 310 may then determine which pole-pair is associated with the sine wave and the cosine wave, compensate each accordingly, and then determine angular position and/or speed from the compensated digitized sine wave and the compensated digitized cosine wave.

Other types of resolvers may be used in alternative embodiments of the resolver compensation system 200. Thus, compensation for error of other electrical and/or mechanical subsystems of an alternative resolver which affect rotor speed may be incorporated into the compensation information 320.

In some embodiments, a supplemental device or another device having a different function may be used as a means for synchronizing the rotor angular position with the resolver output. For example, an electrical or mechanical device may be put on the resolver 306, rotor 314, and/or shaft which provides a rotor angular position signal to processor 310 so that the processor 310 knows precise angular position of the pole-pair(s) in the resolver 306. Such a system could replace the above-described process of computationally determining deviation of the compensated angle error signal (for example, see FIG. 7). All such alternative embodiments are intended to be included within the scope of this disclosure.

The above-described exemplary embodiment of resolver 306 was a two pole-pair resolver. Other embodiments of the resolver compensation system 200 may compensate angle error for a single pole-pair resolver or other multiple pole-pair resolvers. In a single pole-pair resolver, synchronization at initialization is reduced to synchronizing the first sample of a mechanical cycle of the rotor 314 with the first sample of the compensation information 320. In a resolver having more that two pole-pairs, the process illustrated in FIG. 7 would be repeated at least a number of times corresponding to the number of pole-pairs. All such alternative embodiments are intended to be included within the scope of this disclosure.

The above-described embodiment of the resolver compensation system 200 was described as being implemented in vehicle 202 (FIG. 2). Other embodiments of the resolver compensation system 200 may be implemented in other systems. For example, resolvers may be used to determine speed or angular position information of rotors in electrical power generation units and/or excitation systems. As another non-limiting example, resolvers may be used to determine angular position of small electrical motors operating in complex medical devices. Resolvers may be used in a variety of servo motor applications. Embodiments of the resolver compensation system 200 may be used to determine angular position of any type of electrical machine and/or its components. All such alternative embodiments are intended to be included within the scope of this disclosure.

The above-described embodiments determine angular position of the rotor 314 (FIG. 3). Other embodiments may, alternatively or in addition, determine angular position of the pole-pairs of the resolver 306, the rotor of the resolver, the resolver shaft, and/or another suitable component of motor 204.

The above-described exemplary embodiment of the resolver compensation system 200 included the R/D converter 308. In alternative embodiments, the R/D converter 308 is omitted. Another device may be used to provide the output signal of the resolver 306 to the processor 310 in a suitable format, including either digital signals or analog signals.

Processor 310 is typically a commercially available processor. Examples of commercially available processors include, but are not limited to, an 80×86 or Pentium series microprocessor from Intel Corporation, U.S.A.; a PowerPC microprocessor from IBM; a Sparc microprocessor from Sun Microsystems, Inc.; a PA-RISC series microprocessor from Hewlett-Packard Company; or a 68xxx series microprocessor from Motorola Corporation. Processor 310 controls the execution of a program, employed by embodiments of the resolver compensation system 200, residing in the logic 322. Furthermore, for convenience of illustration in FIG. 3, processor 310, memory 312, and logic 322 are shown residing in the resolver compensation system 200. Processor 310, memory 312, and/or logic 322 may reside in alternative convenient locations outside of the resolver compensation system 200, as components of other systems, or as stand-alone dedicated elements, without adversely affecting the operation and functionality of the resolver compensation system 200. Any such alternative embodiments of a resolver compensation system 200 are intended to be within the scope of this disclosure.

Although specific embodiments of, and examples for, the resolver compensation system 200 are described herein for illustrative purposes, various equivalent modifications can be made without departing from the spirit and scope of the disclosure, as will be recognized by those skilled in the relevant art.

The teachings provided herein of the various embodiments can be applied to other control systems in addition to the resolver compensation system 200 generally described above. For example, the resolver compensation system 200 may be embodied in software, hardware, and/or firmware. Additionally, or alternatively, many of the methods and processes described above may include optional acts or steps and additional acts or steps may be added, as will be recognized by those skilled in the relevant arts. Further, the acts or steps of many of the methods and processes described above may be executed in a different order, as will be recognized by those skilled in the relevant arts. The resolver compensation system 200 can have a different organization than the illustrated embodiment, combining some functions and/or eliminating some functions.

These and other changes can be made in light of the above-detailed description. In general, in the following claims, the terms used should not be construed to be limiting to the specific embodiments disclosed in the specification and the claims, but should be construed to include all possible embodiments along with the full scope of equivalents to which the claims are entitled. Accordingly, the embodiments are not limited by the disclosure, but instead its scope is to be determined entirely by the following claims.

What is claimed is:

1. A system that compensates a resolver output signal that corresponds to at least an angular position of a rotor residing in a motor, comprising:
    a resolver operable to output a signal corresponding to a current angular position of at least the rotor;
    a first pole-pair of the resolver operable to generate a first portion of the output signal corresponding to the current angular position of at least the rotor;
    a second pole-pair of the resolver operable to generate a second portion of the output signal corresponding to the current angular position of at least the rotor;
    a memory comprising compensation information corresponding to a resolver angle error of at least one of the first pole-pair and the second pole-pair; and
    a processor operable to receive the output signal corresponding to the current angular position of at least the rotor from the resolver, to synchronize the output signal corresponding to the current angular position of at least the rotor from the resolver with the compensation information stored in the memory corresponding with at least one of the first pole-pair and the second pole-pair, and to generate a compensated output signal.

2. The system as recited in claim 1, wherein the compensation information corresponding to a resolver angle error comprises a first portion of compensation information corresponding to a first resolver angle error of the first pole-pair, and a second portion of compensation information corresponding to a second resolver angle error of the second pole-pair.

3. The system as recited in claim 2, wherein the processor is operable to receive the at least one output signal from the resolver, determine which of the first pole-pair and the second pole-pair generated the at least one output signal, synchronize the output signal from the resolver with one of the first portion of compensation information and the second portion of compensation information in response to determining which of the first pole-pair and the second pole-pair generated the at least one output signal, and generate the compensated output signal.

4. The system as recited in claim 2, wherein the processor, at initialization, is further operable to:
    determine if the current angular position of the rotor is detected by the first pole-pair of the resolver or if the current angular position is detected by the second pole-pair of the resolver;
    in response to determining that the current angular position of the rotor is detected by the first pole-pair, synchronize the at least one output signal from the resolver with the first resolver angle error of the first pole-pair; and
    in response to determining that the current angular position of the rotor is detected by the second pole-pair, synchronize the at least one output signal from the resolver with the second resolver angle error of the second pole-pair.

5. The system as recited in claim 1, further comprising a resolver-to-digital converter (R/D converter) coupled to the output of the resolver and an input of the processor, the R/D converter operable to convert the output signal from the resolver into a digital signal that is communicated to the processor via the input of the processor.

6. The system as recited in claim 1, further comprising a resolver-to-digital converter (R/D converter) coupled to a first output of the output signal of the resolver, a second output of the output signal of the resolver, and an input of the processor, wherein the R/D converter is operable to convert a sine signal from the first output of the resolver and to convert a cosine signal from the second output of the resolver into a digital signal that is communicated to the processor via the input of the processor.

7. The system as recited in claim 1, wherein the resolver is a two pole-pair resolver.

8. The system as recited in claim 1, wherein the resolver is a multi pole-pair resolver.

9. The system as recited in claim 1, further comprising a controller communicatively coupled to the processor, operable to receive the compensated output signal from the processor, and operable to generate a control signal at least corresponding to angular position information of the rotor; and
    a power converter communicatively coupled to the controller, and operable to convert an amount of direct current into a corresponding amount of alternating current, wherein the amount of alternating current operates the motor, and wherein the amount of alternating current corresponds at least in part to the angular position information of the rotor.

10. A system that compensates a resolver output signal that corresponds to at least an angular position of a rotor, wherein a first portion of the resolver output signal is generated by a first pole-pair of the resolver, and wherein a second portion of the resolver output signal is generated by a second pole-pair of the resolver, comprising:
    a means for synchronizing a first amount of resolver angle error with a first portion of the output signal corresponding with the angular position of the rotor;
    a means for synchronizing a second amount of resolver angle error with a second portion of the output signal corresponding with the angular position of the rotor;
    a means for generating a raw output $\theta_{raw}(k)$ signal from a resolver coupled to the rotor; and
    a means for generating a compensated output $\theta(k)$ signal by synchronizing the raw output $\theta_{raw}(k)$ signal with the first amount of resolver angle error when a current angular position of the rotor corresponds to the first amount of resolver angle error, and to generate the compensated output $\theta(k)$ by matching the raw output $\theta_{raw}(k)$ signal with the second amount of resolver angle error when the current angular position of the rotor corresponds to the second amount of resolver angle error.

11. The system as recited in claim 10, further comprising:
    a look up data structure means for storing the first amount of resolver angle error identified with a first indicia and storing the second amount of resolver angle error identified with a second indicia, wherein the $\theta_{raw}(k)$ signal is synchronized with the first amount of resolver angle error from the look up data structure means when the current angular position of the rotor corresponds to the first amount of resolver angle error, and wherein the $\theta_{raw}(k)$ signal is synchronized with the second amount of resolver angle error from the look up data structure means when the current angular position of the rotor corresponds to the second amount of resolver angle error.

12. The system as recited in claim 11, further comprising:
    a memory medium means for storing a first equation modeling the first amount of resolver angle error and having a second equation modeling the second amount of resolver angle error, wherein the $\theta_{raw}(k)$ signal is synchronized with the first equation when the current angular position of the rotor corresponds to the first amount of resolver angle error, and wherein the $\theta_{raw}(k)$ signal is synchronized with the second equation when the current angular position of the rotor corresponds to the second amount of resolver angle error.

13. A system that compensates a resolver output signal that corresponds to at least an angular position of a rotor residing in a motor, comprising:
   a resolver operable to output a signal corresponding to a current angular position of at least the rotor;
   a first pole-pair of the resolver operable to generate a first portion of the output signal corresponding to the current angular position of at least the rotor;
   a second pole-pair of the resolver operable to generate a second portion of the output signal corresponding to the current angular position of at least the rotor;
   a memory comprising compensation information corresponding to a resolver angle error of at least one of the first pole-pair and the second pole pair; and
   a processor operable to receive the output signal corresponding to the current angular position of at least the rotor from the resolver, to correlate the output signal corresponding to the current angular position of at least the rotor from the resolver with the compensation information stored in the memory corresponding with at least one of the first pole-pair and the second pole-pair, and to generate a compensated output signal.

14. The system as recited in claim 13, wherein the compensation information corresponding to a resolver angle error comprises a first portion of compensation information corresponding to a first resolver angle error of the first pole-pair, and a second portion of compensation information corresponding to a second resolver angle error of the second pole-pair.

15. The system as recited in claim 14, wherein the processor is operable to receive the at least one output signal from the resolver, determine which of the first pole-pair and the second pole-pair generated the at least one output signal, correlate the output signal from the resolver with one of the first portion of compensation information and the second portion of compensation information in response to determining which of the first pole-pair and the second pole-pair generated the at least one output signal, and generate the compensated output signal.

16. The system as recited in claim 14, wherein the processor, at initialization, is further operable to:
   determine if the current angular position of the rotor is detected by the first pole-pair of the resolver or if the current angular position is detected by the second pole-pair of the resolver;
   in response to determining that the current angular position of the rotor is detected by the first pole-pair, match the at least one output signal from the resolver with the first resolver angle error of the first pole-pair; and
   in response to determining that the current angular position of the rotor is detected by the second pole-pair, match the at least one output signal from the resolver with the second resolver angle error of the second pole-pair.

17. The system as recited in claim 13, further comprising a resolver-to-digital converter (R/D converter) coupled to the output of the resolver and an input of the processor, the R/D converter operable to convert the output signal from the resolver into a digital signal that is communicated to the processor via the input of the processor.

18. The system as recited in claim 13, further comprising a resolver-to-digital converter (R/D converter) coupled to a first output of the output signal of the resolver, a second output of the output signal of the resolver, and an input of the processor, wherein the R/D converter is operable to convert a sine signal from the first output of the resolver and to convert a cosine signal from the second output of the resolver into a digital signal that is communicated to the processor via the input of the processor.

19. The system as recited in claim 13, wherein the resolver is a two pole-pair resolver.

20. The system as recited in claim 13, wherein the resolver is a multi pole-pair resolver.

* * * * *